Johnson

[11] 3,837,125
[45] Sept. 24, 1974

[54] METHOD ... SCHMIDT CORRECTOR LENSES
[75] Inventor: Thomas J. Johnson, Palos Verdes Estates, Calif.
[73] Assignee: Celestron Pacific, Torrance, Calif.
[22] Filed: Sept. 4, 1973
[21] Appl. No.: 393,846

[52] U.S. Cl. .................................. 51/284, 51/324
[51] Int. Cl. .......................... B24b 1/00, B24b 13/00
[58] Field of Search .......... 51/284, 324, 235, 281 R, 51/216 LP, 283

[56] References Cited
UNITED STATES PATENTS

| 3,210,894 | 10/1965 | Bentley | 51/284 |
| 3,465,481 | 9/1969 | Szwarcman | 51/324 |
| 3,685,216 | 8/1972 | Frey | 51/324 X |
| 3,693,301 | 9/1972 | Lemaitre | 51/324 X |
| 3,794,314 | 2/1974 | Coburn | 51/284 X |

FOREIGN PATENTS OR APPLICATIONS

| 83,256 | 7/1971 | E. Germany | 51/284 |

... ... Great Britain ............... 51/284

OTHER PUBLICATIONS

Sakurai et al., Applied Optics, "Study of the Fabrication of Aspherical Surfaces," November, 1963, QC 350 A5

Primary Examiner—Donald G. Kelly

[57] ABSTRACT

A method and system for making Schmidt correctors wherein the surface of a master glass template is ground and polished to an accurate inverse curve of a corrector plate, a thin glass workpiece is placed under vacuum on the master glass template in intimate curve conformed glass-to-glass contact over the entire mating surfaces, the template and workpiece being conjointly rotated while grinding and polishing the upper free surface of the workpiece to a uniform accurate flatness whereafter the vacuum is released and the workpiece is removed from the template in final form.

11 Claims, 11 Drawing Figures

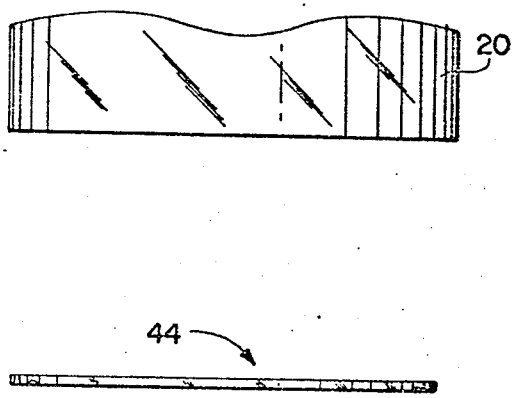
FIG. 1
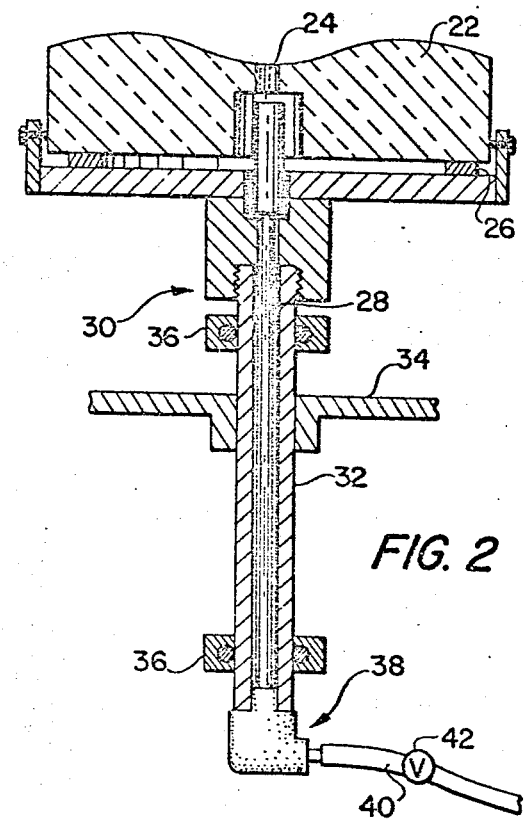
FIG. 2
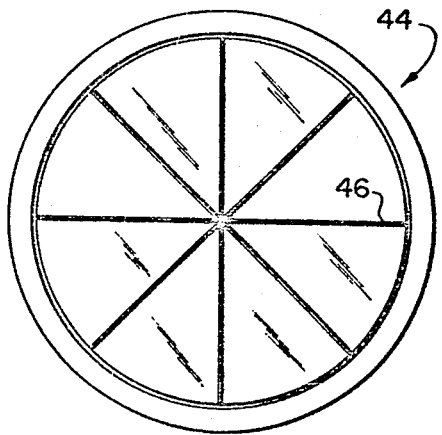
FIG. 3
FIG. 4
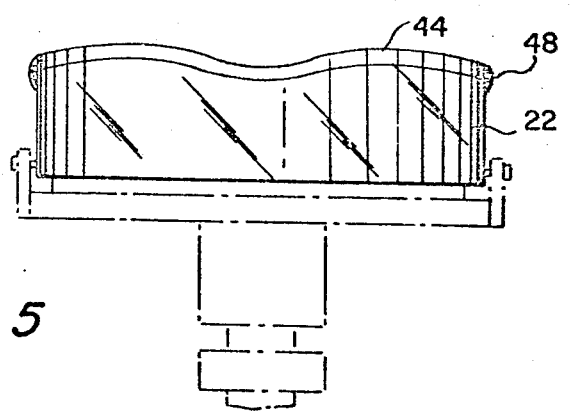
FIG. 5

METHOD AND SYSTEM FOR MAKING SCHMIDT CORRECTOR LENSES

BACKGROUND OF THE INVENTION

Prior Art

New Procedure for Making Schmidt Corrector Plates, Applied Optics, Volume 11, No. 7, July, 1972. The Vacuum Method of Making Corrector Plates, Sky and Telescope, June, 1972. Making Corrector Plates by Schmidt's Vacuum Methods, Applied Optics, May, 1966, Volume 5, No. 5, pages 713–715. U.S. Pat. No. 3,693,301, Lemaitre. Study of the Fabrication of Aspherical Surfaces, Sakurai & Shishido, Applied Optics, November, 1963.

There are two techniques well known in the literature for figuring Schmidt corrector plates, the first of which is often referred to as a classical approach and the second approach is referred to as the vacuum deformation techniques, as evidenced, in part, by the aforementioned cited art.

The first approach, the classical approach, involves using a glass blank of high optical quality and of sufficient thickness so that one side can be worked without the glass blank slightly bending or deflecting due to work temperature or pressure during the grinding and polishing phase. The Schmidt curve is ground into the surface by rotating the blank about its center and using grinding laps which favor the areas where more glass is to be removed. It is important in this process that most of the grinding and shaping work be done with the rigid glass blank being rotated about its center on or under a grinding tool that contacts the entire surface, the grinding lap also being rigid, and this tends to keep the glass plate a perfect figure of revolution which is essential. After the shape is roughed in by courser grits, the grinding lap is cleaned thoroughly and finer grits are applied. This is repeated using progressively finer grits until the plate is ready for polishing. It is during the fine grinding stage that the figure is checked optically. The corrector is set up with the balance of the optical system with which it is to be used and tested with an optical collimater. Null testing techniques and interferometer techniques are commonly known, which allow a worker to read the errors in glass to determine the zones which need to be worked down. Using this classical approach, a high degree of skill and training are required to read the errors and properly interpret them.

The second approach, the vacuum deformation technique, is attributed to Schmidt, the original inventor of the Schmidt corrector plate. This approach consists of using a thin glass blank as a cover for a vacuum-tight chamber. When the vacuum is applied, the thin glass blank bends into the shape of a catinary curve rather than a spherical shape. While in this bent configuration, the top side of the blank is ground and polished spherical. When the vacuum is released and if the processing has been successful, there purportedly would result a perfect Schmidt corrector plate. The vacuum deformation approach implies that a thin plate can be bent sufficiently accurately and will remain sufficiently stable during the grinding procedure to result in a usable Schmidt plate. For a visual telescope, the requirements on a Schmidt plate are so demanding that the residual errors must be a small fraction of a wave length of light or accuracy approaching a millionth of an inch.

If an O ring is used as suggested in the Sky and Telescope article, small inhomogenouities in the glass will result in non-uniform bending and therefore astigmatism or nonconcentricity about its center. This approach is barely acceptable for use with a camera and would hardly be adequate if the corrector were to be used in a visual Schmidt Cassegrain system for example.

If in using the vacuum deformation approach, the O ring is dispensed with an a rigid ring used, the ring would have to be perfectly shaped and even then the smallest bit of dust or film at the interface between the glass and ring would still render the resulting plate of poor quality.

In the Applied Optics, November, 1963 article, it was suggested that a thin glass blank be bent over a mold having the inverse to the Schmidt curve. The opposite side would be ground and polished flat while in this bent configuration. The article did not specify as to how the glass was to be held in place or as to the accuracy with which the mold should be made, nor how it would be determined that the glass was actually in conformation with the mold. The article further was devoid of a teaching of the material from which the mold was to be made.

The present invention teaches a method and system which overcomes the drawbacks of the prior art and results in the possibility of producing high quality corrector lenses at a comparatively extremely high rate with a high degree of accuracy.

BRIEF DESCRIPTION OF THE INVENTION

A method and system for making Schmidt correctors wherein a thick glass master block is figured to the inverse curve of the Schmidt plate, mounted on a spindle of a grinding and polishing machine, the master block having a bore therethrough, grinding and polishing the master block into a master glass template. A thin test piece of glass having shallow grooves therein is placed on the master glass template with the grooves at the interface, and a vacuum is applied through the bore to conform the test piece to the inverse contour curve on the master glass template. The workpiece is drawn and held in intimate curve conformed glass-to-glass contact over the entire mating surfaces under the vacuum and the test piece and template are rotated while grinding the upper surface of the test piece flat. The test piece is removed and tested for accuracy, noting and marking zones having excess glass thereon. The master glass template is then reground and polished to remove residual material. The test piece is repetitively replaced on the master glass template with the upper top side of the test plate being reground and polished to flatness and subsequently tested for accuracy of the ground inverse curve on the master glass template which is repetitively reground and polished until the desired degree of accuracy of contour is achieved. The so contoured surface of the master glass template is then grooved and a corrector plate blank is placed on the finalized template in intimate sealing contact therewith under vacuum and the upper surface of the blank is ground to accurate flatness to finalize the corrector.

Additional objects, features and advantages of the present invention will be more readily apparent from the following detailed description of an embodiment thereof when taken together with the accompanying drawings in which:

FIG. 1 is a section through a glass master block to be contoured;

FIG. 2 is a schematic elevational view, partly in section, of apparatus for grinding the master glass template;

FIG. 3 is a section of a thin test piece of glass used in practicing the invention;

FIG. 4 is a plan view of the test piece of FIG. 3;

FIG. 5 is a fragmentary sectional view showing application of a test piece to the master glass template for grinding of the upper surface of the test piece;

Figure 6:
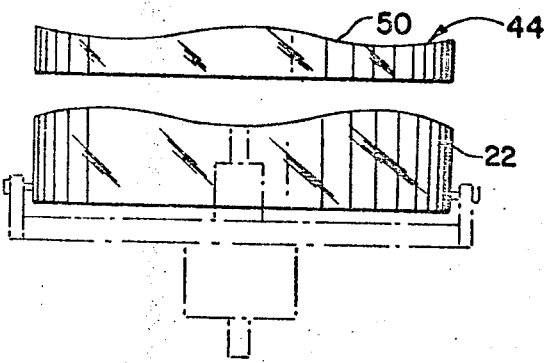
FIG. 6 is a fragmentary exploded view disclosing the test piece removed from the template after grinding.

Referring now in detail to the drawings, a thick glass block 20 of good anneal and stability and having a larger diameter than the desired Schmidt plate is carefully figured to the inverse curve of the Schmidt plate. Special processes for developing this curve are described hereinafter. The glass block which is later to become a master glass template 22 is provided with a through extending bore 24 and mounted on a backing plate generally indicated at 26 which in turn is mounted on the spindle 28 of a grinding and polishing machine generally designated 30. The backing plate spindle 28 is hollow and mounted in a hollow shaft 32. A drive pulley 34 is operatively connected to rotate the spindle assembly. The shaft is mounted for rotation in bearings 36. A rotating vacuum coupler 38 interconnects shaft 32 and the backing plate spindle through a tube 40 or the like having a cutoff valve 42 to a vacuum source or reservoir.

A thin test piece of glass 44 is prepared for use. The surface must be quite good, free from orange peel effect typical of quick polishing and reasonably flat, within about one-half fringe per inch. Some shallow grooves 46 are cut into the test piece in a cartwheel pattern. The test piece for a 8 inch f/2 corrector would be typically 10 inches in diameter and the circular groove would be at about 9 inches diameter and concentric.

The inverse curve of the corrector plate is ground and polished into the master glass template 22 which might be referred to as the contour block. The thin glass test piece 44, as well as the contour block 22, are carefully cleaned and the test piece is placed on the contour block with the grooves at the interface. Vacuum is now applied to the apparatus. The thin test piece will deform to the curve that is on the contour block. Any film, dirt particles, or areas of nonconformation are readily noted by noting the interference fringes at the interface of the test piece and the contour block. A commonly used method to determine whether or not a spherical surface on glass meets its required accuracy is to make a master glass having the opposite curve. The two pieces are placed one on the other, the combination held under a light source (flat and usually monochromatic). The reflections at the interface between the master and the workpiece are observed. If they are very close to the same curve, the light from one of the surfaces will interfere with that from the other and Newtonian rings or interference fringes may be observed. The character of these interference fringes is such that the worker may accurately determine the relative match between the master and the workpiece. If the two glass surfaces exactly match, and if they are perfectly cleaned, then placed in contact with each other, any reflection at the interface will disappear. The two pieces of glass will go into a semimolecular bond and may result in difficulty separating the two pieces of glass. The bond is of such strength and character in this case that some glass workers will bond a number of small pieces of glass that are all to be parallel and the same thickness to a larger master glass flat. An additional bonding agent may be placed around the edges of the smaller pieces. These pieces hold so rigidly together that they can now be ground and polished as a unit. The pieces are usually separated by reducing the temperature of the master in a refrigerator until the work pieces snap off.

As shown in FIG. 5, the test piece placed on the contour block 22 in the apparatus can have a wax seal 48 applied at the edges. Perfect conformation of the workpiece to the contour block is achieved when all reflection at the interface has disappeared and intimate glass-to-glass contact is then achieved.

The top surface of the test piece is then ground flat by rotating the spindle on the machine and using a flat grinding lap driven by the over arm of the machine. It may be polished out as desired. The vacuum is then released, see FIG. 6, and the test piece 44 removed from the contour block. Since the workpiece will tend to bond to the contour block where intimate glass-to-glass contact has been achieved, care must be exercised in separating the pieces. If compressed air is introduced through the spindle, for example, the pieces may separate too quickly as the pressure is slowly increased. The best method of separating the pieces is to place a thin piece of metal at the edges, such as a razor blade, and slowly pry the piece up. As will be seen, the test piece 44 after being so ground and released, will have at least an approximate surface contour as indicated at 50.

The test piece may be set up with a primary mirror and a secondary mirror and tested. The zones where there is excess glass are marked and the contour block is further figured by grinding and polishing or simply polishing, depending on how large the residual errors are at each test. Zones of excess glass on the test corrector are areas where depressions occur on the contour block since it has the inverse curve. After the contour block has been reworked the procedure of placing the workpiece in contact and regrinding its top side flat is repeated over and over until the desired curve on the contour block is achieved.

After the final figure of reverse curve to the required degree of accuracy is achieved, the contour block itself is grooved in the cartwheel pattern of FIG. 4. These grooves are typically 0.010 inch deep and 0.1 to .02 wide. In any event, the width of these grooves must be very small compared to the thickness of the desired finished Schmidt corrector plate. If not, there would be some bending of the glass into the grooves which would deteriorate the performance of the finished lens.

Grooves having a 0.02 width are satisfactory when the finished corrector thickness is about 0.125 thick or thicker.

Figure 7:
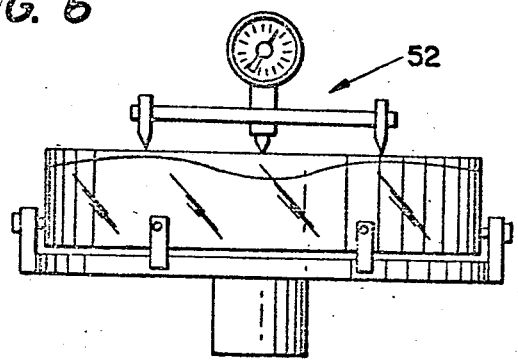
FIG. 7 is a schematic view for flatness surface grinding determination of the test piece.

It is pointed out here that the procedure of developing the inverse curve on the contour block is even more laborious than producing a single corrector lens by the classical method. After it has been made, however, high quality corrector lenses can be reproduced at a rate of about one plate in a 4 hour period for each machine in use. A single operator can easily handle as many as 12 machines after he has developed some skill. In producing Schmidt corrector lenses using the technique described the only critical stages in the procedure are in the cleaning of the workpiece and the contour block so that intimate glass-to-glass contact be achieved over the entire surface. The worker must develop clean working habits so that scratches do not occur on the workpiece during the fine grinding and polishing periods. The worker checks the surface of the workpiece after each progressively finer grit with a spherometer capable of reaching to 0.0001 inch. The spherometer base should extend over about two-thirds of the diameter of the workpiece. This is schematically shown in FIG. 7. The spherometer is first checked on a reference flat, then the deviation from flatness of the workpiece is read. During the grinding stage of the corrector on the contour block a spherometer is used to check for flatness of the top side of the workpiece. The plate is ready for final polish when the finest grit has been finished in the grinding stage and flatness to within about .0005 inches on the spherometer is achieved. During the polishing stage flatness is checked several times to make sure that the surface remains uniformly flat.

Figure 8:
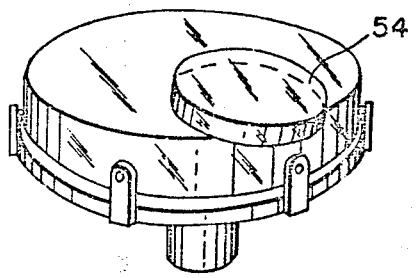
FIG. 8 is a schematic drawing of a final testing for flatness of the test piece.

Final test for flatness may be made by placing a small optical flat 54 (FIG. 8) on the surface of the corrector while it remains in contact with the contour block. A typical corrector might be a 100 fringe aspheric, this means that the desired degree of deviation from a flat surface of the finished corrector is 100 fringes or approximately 0.001 inches. When testing the final flatness deviation a satisfactory corrector figure is indicated if the top surface does not deviate more than 3 or 4 percent total and that this deviation is a smooth spherical section. In this illustration an 8 inch corrector having a 100-fringe aspheric figure should have its top surface flat to within plus or minus about one-half fringe per inch, but this deviation should be constant over the entire surface. The optical flat is placed on the top side of the ground and polished corrector lens while still in contact with the master. Interference fringes appear at the interface between the flat and the plate if they are well cleaned and near the same curve. The shape and number of these fringes tell the worker the shape of the plate being worked. If extending the technique beyond the limits set by maximum glass deformation before fracturing occurs, the following is recommended.

Figure 9:
FIG. 9 is a sectional view of a Schmidt corrector as made from a master contour block or template having one-half of a desired correction.

From an optical performance point of view the corrector plate need only be thick enough to support its own weight in the instrument and not be so fragile that it must break under normal instrument usage. For this reason the optimum thickness of an 8 inch corrector lens might fall in the range 0.15 to 0.20 inches. It may be desired to fabricate a corrector which requires a curve greater than the glass will safely deform. As an illustration, an 8 inch $f/1.5$ Schmidt camera calls for a corrector having a curve in excess of the amount that 0.125 glass can be deformed. In this case a portion of the correction is ground onto one side of the glass and then the balance of the correction is ground onto the other, i.e., ground and polished. For this purpose, a contour block 56 (FIG. 9) which has been figured to produce an 8 inch $f/2$ can be used. Then it is reversed (FIG. 10) and placed in contact with a contour block that has been figured to produce the 8 inch $f/1.5$. The maximum deviation that can be accomplished, then, on a Schmidt corrector is set by approximately half of the curve being applied to each of the two sides.

Figure 10:
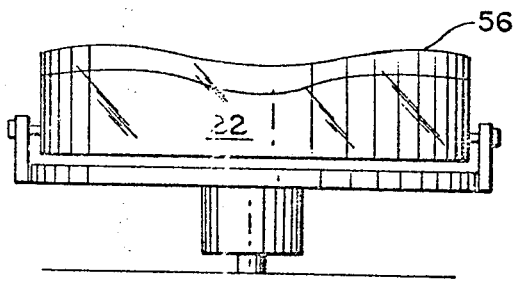
FIG. 10 is a schematic fragmentary view of the corrector plate of FIG. 9 placed on a full correction contour block for further processing.
Figure 11:
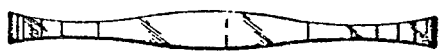
FIG. 11 is a sectional view of a resulting corrector having one-half of curve on each side.

Subsequent to this mounting as shown in FIG. 10, the upper surface of the piece 56 is again ground flat as delineated hereinbefore, and the resulting corrector 58 is shown in FIG. 11 having one-half of the curve on each side.

Manifestly, minor changes in details can be effected without departing from the spirit and scope of the invention as defined in and limited solely by the appended claims.

I claim:

1. A method for making Schmidt correctors comprising:
   A. grinding and polishing a surface of glass block to an accurate inverse curve of the desired corrector to form a master glass template;
   B. mounting a thin glass workpiece on the master glass template;
   C. drawing a vacuum between the workpiece and master glass template to conform the workpiece in intimate curve conformed glass-to-glass contact over the entire mating surfaces thereof;
   D. conjointly rotating the so combined workpiece and master glass template while grinding and polishing the upper surface of the workpiece to a uniform accurate flatness; and
   E. releasing the vacuum and removing the finished contoured corrector.

2. A method as claimed in claim 1, wherein the glass block is relatively thick and of good anneal and stability and having a larger diameeter than the desired Schmidt corrector.

3. A method as claimed in claim 2, including mounting the glass block which has a bore therethrough on a backing plate, mounting the backing plate and glass block on the spindle of a grinding and polishing machine, the grinding machine having a hollow spindle through which the vacuum is drawn.

4. A method as claimed in claim 2, wherein to form the master glass template, a thin test piece of glass is cut to form shallow grooves in a surface thereof in a cartwheel pattern, the test piece is mounted on the glass block with the grooves at the interface between the test piece and glass block, and a vacuum drawn between the block and test piece to deform the test piece to the curve on the contour block as previously ground, the vacuum forming an intimate glass-to-glass contact between the components and the upper surface of the test piece is thereafter ground to a uniform accurate flatness, removed and tested for accuracy of the desired inverse curve on the block, excess glass being marked on the test piece and the block is thereafter further ground or polished to remove residual errors in the contour surface thereof.

5. A method as claimed in claim 4, including repetitively reworking the contoured surface of the block and repetitively placing the workpiece in contact and regrinding its top side flat until the desired curve on the contour block is achieved.

6. A method as claimed in claim 5, including the step of, after the desired reverse curve has been formed in the surface of the master glass template, grooving the upper surface of the master glass template in a cartwheel pattern and thereafter mounting the thin glass workpiece on the master glass template.

7. A method as claimed in claim 6, including progressively grinding and polishing the upper surface of the workpiece in steps utilizing finer grits and checking the flatness of the top side of the workpiece with a spherometer to determine that the surface remains uniformly flat.

8. A method as claimed in claim 7, including a final test for flatness by placing a small optical flat on the surface of the corrector while it remains in contact with the master glass template.

9. A method as claimed in claim 8, wherein the workpiece is initially ground on a master template having one-half the desired correction and thereafter reversely mounted on a template having a full correction curve and grinding the upper surface of the workpiece so that the resulting corrector has one-half of the desired curve on each side thereof.

10. A method as claimed in claim 6, wherein the master glass template has a bore therethrough and the vacuum being drawn through said bore.

11. A method for making Schmidt correctors wherein a thick glass master block is figured to the inverse curve of the Schmidt plate, mounted on a spindle of a grinding and polishing machine, the master block having a bore therethrough grinding and polishing the master block into a master glass template, placing a thin test piece of glass having shallow grooves therein, with the grooves at the interface, on the master glass template, applying a vacuum through the bore to conform the test piece to the inverse contour curve on the test piece, grinding the top surface of the test piece flat, removing the test piece and testing for accuracy, noting and marking zones having excess glass thereon, regrinding and polishing the master glass template to remove residual material, repetitively replacing the test piece on the master glass template and again regrinding its top side flat, regrinding and polishing the master glass template until the desired degree of accuracy of contour is achieved, grooving the contoured surface of the master glass template, placing a corrector plate blank on the finalized master glass template in intimate sealing contact therewith under vacuum, and grinding the upper surface to accurate flatness to finalize the corrector.

* * * * *